United States Patent
Risch

(10) Patent No.: US 11,319,048 B2
(45) Date of Patent: May 3, 2022

(54) SYSTEM FOR THE AUTOMATIC UNLOCKING OF A DOOR OF AN AIRCRAFT

(71) Applicant: AIRBUS OPERATIONS GMBH, Hamburg (DE)

(72) Inventor: Ronald Risch, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 587 days.

(21) Appl. No.: 16/201,032

(22) Filed: Nov. 27, 2018

(65) Prior Publication Data
US 2019/0168857 A1    Jun. 6, 2019

(30) Foreign Application Priority Data
Nov. 28, 2017   (DE) ...................... 10 2017 221 278.0

(51) Int. Cl.
*B64C 1/14*     (2006.01)
*E05B 77/12*    (2014.01)

(52) U.S. Cl.
CPC ............ *B64C 1/1423* (2013.01); *E05B 77/12* (2013.01); *E05Y 2900/502* (2013.01); *E05Y 2900/531* (2013.01)

(58) Field of Classification Search
CPC ....... B64C 1/1423; B64D 25/00; E05B 77/12; E05Y 2900/502
USPC ...................................................... 244/129.5
See application file for complete search history.

(56) References Cited

U.S. PATENT DOCUMENTS

| 2,754,904 | A | | 7/1956 | Provenzano | |
|---|---|---|---|---|---|
| 6,065,797 | A | * | 5/2000 | Shirasaka | E05B 77/12 292/DIG. 65 |
| 6,152,400 | A | * | 11/2000 | Sankrithi | B64D 11/00 105/315 |
| 6,467,729 | B2 | * | 10/2002 | Buchs | B64C 1/1407 244/129.5 |

(Continued)

FOREIGN PATENT DOCUMENTS

| CN | 109987215 A | 7/2019 |
|---|---|---|
| DE | 20 2013 105 503 U1 | 2/2014 |

(Continued)

OTHER PUBLICATIONS

German Search Report for Application No. 10 2017 221 278.0 dated Mar. 2, 2018.

(Continued)

*Primary Examiner* — Nicholas McFall
*Assistant Examiner* — Marisa V Conlon
(74) *Attorney, Agent, or Firm* — Jenkins, Wilson, Taylor & Hunt, P.A.

(57) ABSTRACT

A system for automatic unlocking of a door of an aircraft in the event of impact of the aircraft includes a door opening, a door articulated on the aircraft in the door opening, and a locking arrangement designed to lock the door to the aircraft when the door is in a closed, use state. The locking arrangement has a load-transmission device which is designed, and coupled to an impact region of the aircraft, such that, in the event of impact of the aircraft in the impact region, the load-transmission device transmits a deformation load, caused by inward deformation of the impact region, to the locking arrangement and thus unlocks the door.

11 Claims, 3 Drawing Sheets

(56) References Cited

U.S. PATENT DOCUMENTS

2015/0329194 A1* 11/2015 Joern .................. B64C 1/1423
                                                    244/129.5

FOREIGN PATENT DOCUMENTS

| EP | 2 644 495 A1 | 10/2013 |
| EP | 2 644 495 B1 | 6/2015 |
| EP | 2 944 562 A2 | 11/2015 |
| FR | 3040721 A1 | 3/2017 |
| FR | 3076813 A1 | 7/2019 |

OTHER PUBLICATIONS

French Search Report for Application No. 1872022 dated Apr. 21, 2020.

* cited by examiner

SYSTEM FOR THE AUTOMATIC UNLOCKING OF A DOOR OF AN AIRCRAFT

CROSS-REFERENCE TO RELATED APPLICATION

This application claims priority to German Application No. 10 2017 221 278.0 filed Nov. 28, 2017, the entire disclosure of which is incorporated by reference herein.

TECHNICAL FIELD

The present disclosure relates to a system for the automatic unlocking of a door of an aircraft in the event of impact of the aircraft, and to an aircraft having such a system.

BACKGROUND

For the rapid evacuation of passengers from a passenger aircraft, for example following an emergency landing, use is usually made of a number of passenger-aircraft doors, which are arranged in a fuselage or an outer skin of the passenger aircraft. Such doors can be regular entry and exit doors, doors for unloading and loading baggage and/or supplies or emergency-exit hatches or the like provided specifically for evacuation purposes, for example in the region of the wings of the passenger aircraft, see, for example, EP 2 644 495 B1 and EP 2 944 562 A2.

A passenger aircraft typically has an emergency-opening system for the corresponding doors, the emergency-opening system ensuring, in the event of an emergency landing, that the doors can be opened as quickly as possible and emergency slides or similar evacuation aids can be deployed. Such emergency opening of the passenger door can be realized, for example, with the aid of a gas-operated cylinder or actuator (cf., for example, EP 2 644 495 B1) wherein gas pressure moves a piston with a piston rod, arranged in a cylinder, in order thus to bring a passenger door into an open position.

The fuselage of a typical passenger aircraft comprises one or two passenger decks, which are arranged in an upper region of the fuselage, and a cargo deck, which is located therebeneath. In the event of impact or of emergency landing of the aircraft, the resulting impact energy is introduced into the lower fuselage region of the cargo deck, so that deformation and damage do not occur, at least directly, in the region of the passenger cabins. Nevertheless, (emergency) doors, and in particular the door frames and/or the surroundings thereof, are rendered as robust and resistant as possible, in order to ensure that the doors unlock, and open, despite impact and possibly occurring deformation of the fuselage. These and other reasons mean that a considerable weight of material is sometimes incorporated in the region of the doors.

In order to improve the sustainability and the economy of passenger aircraft further, thought is sometimes given to providing passenger seats, in addition, in the lower fuselage regions reserved, up until now, usually exclusively for accommodating cargo, i.e. in a region which is subjected to relatively high deformation loading.

Against this background, it is the object of the present disclosure to provide for simplified emergency unlocking for aircraft doors.

SUMMARY

This object is achieved by a system and by an aircraft having features disclosed herein.

Accordingly, the disclosure herein provides a system for the automatic unlocking of a door of an aircraft in the event of impact of the aircraft. The system comprises a door opening; a door, which is articulated on the aircraft in the door opening; and a locking arrangement, which is designed or configured to lock the door to the aircraft when the door is in a closed, use state; wherein the locking arrangement has a load-transmission device which is designed or configured, and coupled to an impact region of the aircraft, such that, in the event of impact of the aircraft in the impact region, the load-transmission device transmits a deformation load, caused by inward deformation of the impact region, to the locking arrangement and thus unlocks the door.

The disclosure herein also provides an aircraft having a system according to the disclosure herein.

The disclosure herein is based on a concept of utilizing the kinetic energy which arises in the event of impact, shock and/or collision of an aircraft for example in relation to a hard underlying surface, in order for one or more doors of the aircraft to be unlocked in an automated manner, i.e. automatically. For this purpose, the load-transmission device is coupled to a region of the aircraft, or positioned in such a region, e.g. a lower fuselage region and/or a lower wing region, which is predominantly affected by the impact and is deformed as a result. For example, this impact region can be a base region of a fuselage, i.e. the lowermost region of the fuselage, which is the region of an aircraft which is typically the first to create impact. The kinetic energy of the impact is converted into deformation energy, i.e. deformation loading arises in the corresponding region of the fuselage. The load-transmission device, then, is designed or configured, and arranged, such that this deformation loading can be utilized in order to release a locking mechanism. In this context, a door-locking arrangement is released in an automated manner when the aircraft undergoes deformation in the corresponding region. The unlocking operation can thus be triggered advantageously directly by the impact, so that the aircraft can be rapidly evacuated.

The solution according to the disclosure herein provides a series of advantages in relation to conventional solutions for emergency unlocking of aircraft doors. It is thus possible to reduce a considerable amount of weight in the region of the doors or door frames, in particular in respect of the reinforcement of the same. In the present solution, the doors are unlocked more or less instantly, in a first phase of impact. This takes place irrespective of whether, as the impact process continues, further deformation of the aircraft should arise. If this deformation were to act on one or more door regions, the corresponding door of conventional solutions, which do not provide for instant unlocking brought about directly in the physical sense by the impact, would possibly no longer be capable of being unlocked, since the corresponding mechanism has possibly become deformed as well. For this reason, prior-art solutions provide for considerable reinforcement of the doors and/or of the door frames, in order to ensure that the doors can still be unlocked following impact. In the disclosure herein, this additional weight can be reduced at least to a great extent. This saves, in turn, on jet fuel and costs. Furthermore, there is no need for any specific actuators, sensors and/or control devices. Rather, the present solutions can make use of a robust and straightforward for example mechanical solution for load-transmission purposes. For example, it is possible for a lever or the like to be fastened in a region of a fuselage away from the impact region at the door, i.e. in a region which is not deformed directly, and to project into the impact region, and/or be coupled thereto, such that, in the event of inward deformation caused by impact, it is moved into the interior of the fuselage and thus moves further elements of the locking arrangement so that the door becomes unlocked.

Automatically, within the context of the disclosure herein, is understood to mean that the unlocking operation takes place in an automated manner as a result of the impact, without for example a flight attendant necessarily having to take action. In the disclosure herein, the unlocking operation is triggered directly by transmission of the kinetic impact energy.

Advantageous configurations and developments can be gathered from the disclosure herein and with reference to the figures.

According to one development, the load-transmission device can transmit the deformation load mechanically, electrically, hydraulically and/or pneumatically. For example, it is possible for the load-transmission device to comprise a lever which is arranged such that, in the event of inward deformation, it is moved, or rotated, mechanically into the interior of the fuselage. This (rotary) movement can be utilized to actuate, for example, further load-transmission elements (for example a pull rod and/or pull cable coupled to the lever), which in turn can move a catch bolt of the locking arrangement in order to release the latter. It is also possible to provide electrically operated systems, which can comprise electrically operated sensors, actuators, control means, etc.

According to one development, the load-transmission device can comprise a load-transmission element. The load-transmission element can be designed or configured in the form of a lever, linkage and/or cylinder. For example, deformation energy can be transmitted by a hydraulically and/or pneumatically operated cylinder of a corresponding hydraulic and/or pneumatic system. As an alternative, or in addition, use can be made of mechanical elements such as levers or pull rods, etc.

According to one development, in order to transmit the deformation load, the load-transmission device can perform a translatory movement and/or a rotary movement. In a specific example, a lever can be rotated by inward deformation, which can result, in turn, in a translatory movement of a pull rod which is coupled to the lever, and via which the locking arrangement is then released.

According to one development, the impact region can be adjacent to the door opening. For example, the impact region can be arranged in a base region of an aircraft fuselage, while the door opening is located in a lower region of the aircraft fuselage, in the vicinity of the base region. In alternative developments, however, it is likewise possible for the impact region to be formed at a distance from the door opening. For example, the impact region can be provided in a floor region and/or a wing region of the aircraft, while the door opening is located in an upper, or at least spaced-apart, region of the aircraft fuselage and/or of a wing.

According to one development, the door opening can be provided in a fuselage of the aircraft. In principle, however, it is likewise possible for the door opening to be provided in a wing and/or a wing region of the aircraft.

According to one development, the impact region can be provided in a base region of a fuselage of the aircraft. In particular, the lowermost section of the fuselage can form an impact region. Accordingly, it is possible for the load-transmission device to be arranged in this region and/or to be coupled mechanically, electrically, hydraulically and/or pneumatically thereto.

According to one development, the impact region can be provided in a wing region of the aircraft. For example, the aircraft can be designed or configured in the form of a flying-wing aircraft, blended-wing-body aircraft or hybrid-wing-body aircraft or the like, it being possible for the aircraft to have a more or less clear dividing line between a fuselage and wings. In one example, the aircraft can have a seamless transition between a fuselage and wings. In another example, the aircraft can have a wing which performs the function of both fuselage and wing. For example, the aircraft of such a design can create impact in the first instance by way of one or more wings, it therefore being possible for the impact region to be arranged in a wing region. In principle, the impact region can be formed both in a fuselage region and in a wing region, in particular the impact region can merge from a fuselage region into a wing region.

According to one development, the locking arrangement can also comprise an unlocking safeguard. The unlocking safeguard can be designed or configured to block and/or enable unlocking of the door by the load-transmission device. Provision can be made here for the corresponding door not to become fully unlocked immediately upon impact. Provision can be made for an additional, for example manual, unlocking operation of the door to be necessary in order for the latter to be opened. This can be realized, for example, via a straightforward mechanical lever, which remains movable even when the fuselage is subjected to pronounced deformation.

According to one development, the unlocking safeguard can be designed or configured for manual actuation.

According to one development, the unlocking safeguard can be designed or configured in the form of a manual lever.

According to one development, the aircraft can be designed or configured with at least one upper passenger deck and a lower passenger deck, which is arranged beneath the at least one upper passenger deck. The door opening can be formed in the aircraft in the direction of the lower passenger deck. For example, the aircraft can be a wide-body aircraft or a narrow-body aircraft with one or two upper, continuous passenger decks and a lower passenger deck, which is located therebeneath and, rather than extending for example continuously, extends only over part of the length of the fuselage (e.g. the lower fuselage region can be divided up in the longitudinal direction into a lower passenger deck and an adjoining cargo deck). It is thus possible for the lower passenger deck to be formed, in particular, in a lower half of a fuselage, in which usually only a cargo deck is located.

The above configurations and developments can be combined in any desired manner, as expedient. Further possible configurations, developments and implementations of the disclosure herein also include combinations, not explicitly mentioned, of features of the disclosure herein which are described above or hereinbelow with reference to the exemplary embodiments. In particular, a person skilled in the art here will also add individual aspects, in the form of improvements or supplements, to the respective basic version of the disclosure herein.

BRIEF DESCRIPTION OF THE DRAWINGS

The disclosure herein will be explained in more detail hereinbelow with reference to the example embodiments indicated in the schematic figures, in which.

Figure 1C:
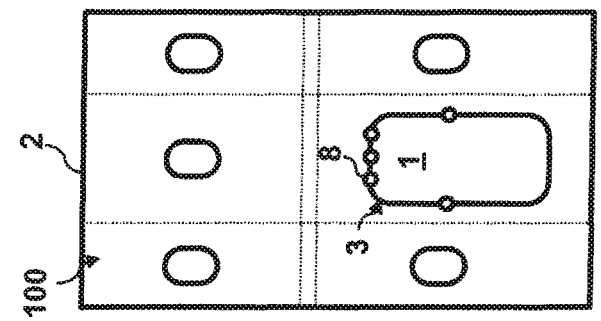
FIG. 1c is a schematic side view of the aircraft from FIG. 1a having a system according to an alternative embodiment of the disclosure herein.

The accompanying figures are intended to impart greater understanding of the embodiments of the disclosure herein. They depict embodiments and, in combination with the description, serve to explain principles and concepts of the disclosure herein. Other embodiments and many of the stated advantages will become apparent when the drawings are viewed. The elements of the drawings are not necessarily shown to scale in relation to one another.

In the figures of the drawing, identical, functionally identical and identically acting elements, features and components are each provided with the same reference signs, unless stated otherwise.

DETAILED DESCRIPTION

Figure 1B:
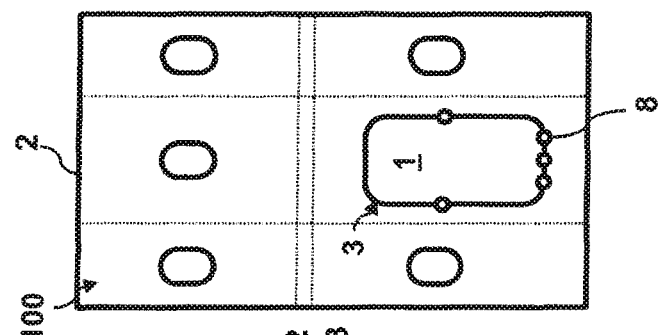
FIGS. 1a and 1b illustrate a schematic sectional view and a side view of an aircraft having a system according to one embodiment of the disclosure herein for the automatic unlocking of a door of the aircraft in the event of impact of the aircraft.
Figure 1A:
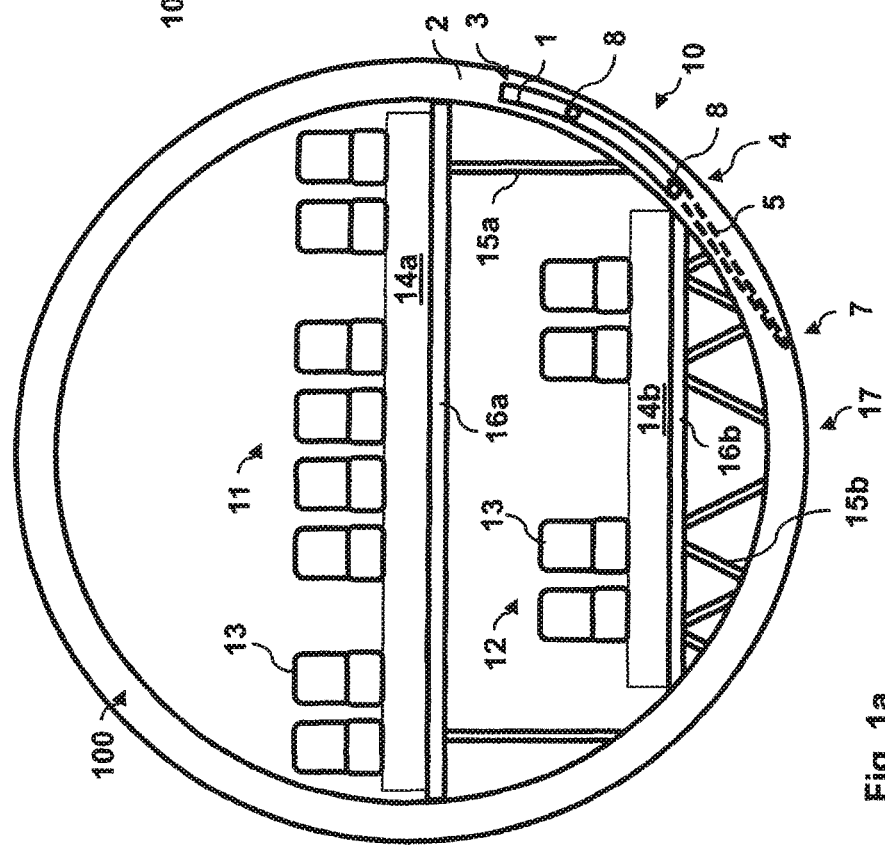

FIG. 1a shows a schematic sectional view of an aircraft 100 having a system 10 according to one embodiment of the disclosure herein for the automatic unlocking of a door 1 of the aircraft 100 in the event of impact of the aircraft 100. FIG. 1b shows a schematic side view of the aircraft 100.

The aircraft 100 illustrated can be, for example, a passenger aircraft, for example a wide-body aircraft, which has a fuselage 2 containing a passenger cabin with two passenger decks 11, 12 arranged one above the other: an upper passenger deck 11 and a lower passenger deck 12. In contrast to typical wide-body aircraft, in the specific example shown, the lower passenger deck 12 is arranged in a lower half of the fuselage 2, in the vicinity of a base region 17 of the fuselage 2, in other words a region which is usually reserved for a cargo deck or the like. In this example, the upper passenger deck 11 can extend over the entire longitudinal extent of the fuselage 2. In contrast, the lower passenger deck 12 can extend in the longitudinal direction for example merely over part of the fuselage 2, so that at least part of the fuselage 2 can be utilized as a cargo deck (not depicted here). The embodiment of the aircraft 100 shown should be understood purely by way of example. It is likewise possible to provide, for example, further passenger decks, e.g. two upper passenger decks and a lower passenger deck. Furthermore, the aircraft 100 can be designed or configured in the form of a narrow-body aircraft or of a general passenger aircraft. Provision is likewise made, in principle, for embodiments of the disclosure herein in which the aircraft is a flying-wing aircraft, a blended-wing-body aircraft or hybrid-wing-body aircraft or the like.

In the embodiment illustrated in FIGS. 1a and 1b, the upper passenger deck 11 comprises a multiplicity of seats 13, which are fastened on an upper-cabin floor 14a, which in turn rests in the customary manner on an upper crossbeam 16a. The entire structure is also retained by upper supporting struts 15a. Similarly, the lower passenger deck 12 likewise comprises a multiplicity of seats 13, which are fitted on a lower-cabin floor 14b, above a lower crossbeam 16b. A multiplicity of lower supporting struts 15b are provided beneath the lower crossbeam 16b and serve to reinforce or stiffen the lower fuselage 2 as a whole. In this lowermost region of the fuselage 2, it is also possible to provide further reinforcements and/or damping systems (not depicted), in order to render the lower fuselage 2 as robust as possible.

The fuselage 2 is provided with a multiplicity of door openings 3, of which one is illustrated by way of example in FIG. 1b. The door opening 3 shown is formed in the fuselage 2 in the direction of the lower passenger deck 12. A respective door 1 is articulated on the fuselage 2 in each door opening 3. The door 1 shown has a locking arrangement 4, which is designed or configured to lock the door 1 to the fuselage 2 when the door is in a closed, use state, e.g. during the flight. In the specific embodiment according to FIGS. 1a and 1b, a total of five locking points 8 are provided, these locking the door 1 to the fuselage 2 (two lateral, and three lower, locking points 8). It is clear to a person skilled in the art that a variety of different concrete configurations of the locking arrangement 4 and of the locking points 8 are possible, depending on requirements and application.

As an alternative example, FIG. 1c shows a corresponding system 10 in a slightly modified embodiment of the disclosure herein. In this specific embodiment, it is likewise the case that a total of five locking points 8 are provided, these locking the door 1 to the fuselage 2. However, in this case, two lateral locking points 8 are supplemented by three upper locking points 8. The door 1 can be articulated on the fuselage 2 in the door opening 3 for example on a lower side, so that, following unlocking, the door 1 swings, or is moved, downwards into an open state to a certain extent in an automated manner under its own weight.

During flight, such a fuselage 2 is naturally subjected to considerable loading and stressing. Various forces and moments are in question here, for example transverse forces, torsional moments and bending moments, etc. Moreover, forces are also created by the considerable internal pressure. All the openings, e.g. door openings, in the fuselage structure fundamentally reduce the loading capability of the structure. For this reason, it is usually necessary to provide the fuselage 2 with thickened material and other reinforcements around the region of the openings, i.e. in the region around the respective cutout in the fuselage. In a weight-optimised fuselage, the loading is borne and/or transmitted in particular also by the doors, both at the upper and lower peripheries as well as along the lateral boundaries. In order to guarantee emergency unlocking of the doors even after impact or the like, and deformation to the door structure or the door mechanisms which may be caused as a result, a considerable weight of material is sometimes incorporated in order to reinforce the doors. In one embodiment, as is shown in FIGS. 1a and 1b, the region of the lower passenger deck 12 is subjected to considerably greater loading than the upper passenger deck 11 in the event of impact of the aircraft 100 in the base region 17. Accordingly, it is also the case that a door 1 which is formed in the region of the lower passenger deck 12 is subjected to greater forces and moments than a door in a higher-level region of the fuselage 2. In the event of such impact, the base region 17, which is located beneath the lower crossbeam 16b, is the first to be deformed as a result of the impact forces, while regions of the fuselage 2 which are further away, e.g. the region around the door 1, remain unaffected at least in the first instance. The present solution makes use of this fact for a locking mechanism of the door 1.

Figure 2A:
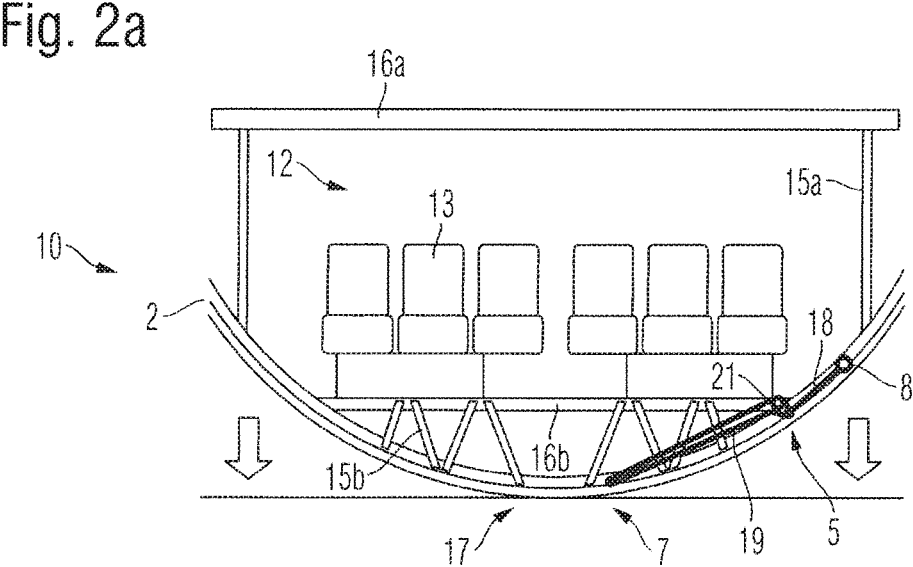
FIGS. 2a-2c are schematic sectional views of the system from FIGS. 1a and 1b during the course of impact of the aircraft.
Figure 2B:
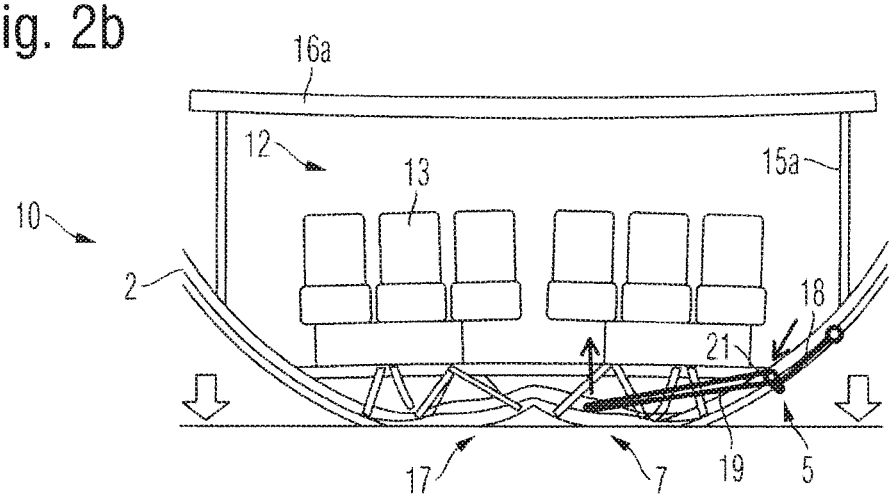
Figure 2C:
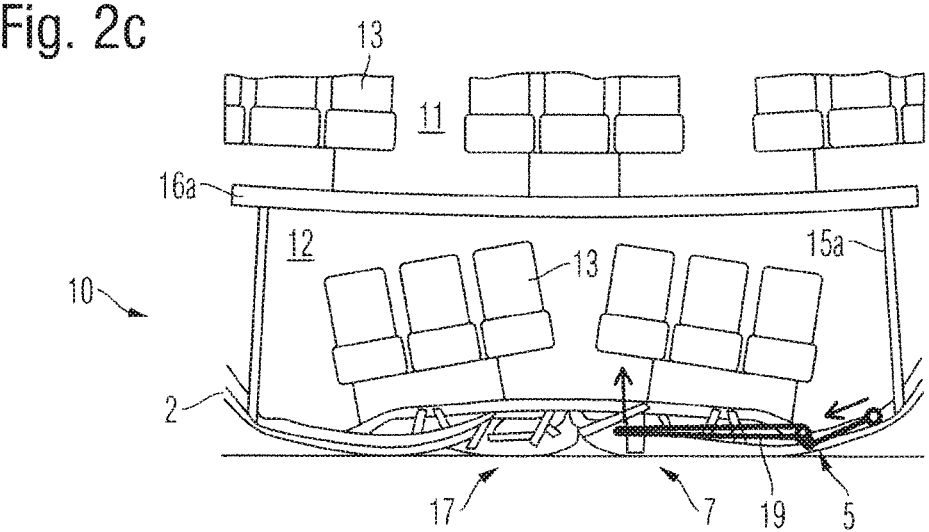

FIGS. 2a-2c show, for explanatory purposes, schematic sectional views of the system 10 from FIGS. 1a and 1b during the course of impact of the aircraft 100. The present solution provides a locking arrangement 4 which has a load-transmission device 5 (cf. FIG. 1a and FIGS. 2a-2c).

The load-transmission device 5 is designed or configured, and coupled to an impact region 7 in the base region 17 of the fuselage 2, such that, in the event of impact of the aircraft 100 in the impact region 7, the load-transmission device 5 transmits a deformation load, caused by inward deformation of the impact region 7, from the fuselage 2 to the locking arrangement 4 and thus unlocks the door 1. The impact region 7 here can be adjacent to the door opening 3. In principle, however, it is likewise possible for the impact region 7 to be arranged at a distance from the door opening.

In specific terms, the load-transmission device 5 here is designed or configured mechanically with a load-transmission element 19, which functions as a lever and is coupled to one or more of the locking points 8 of the locking arrangement 4 via a connecting element 18 (cf. FIGS. 2a-2c). The load-transmission element 19 is arranged at a point of rotation 21 in a region of the fuselage 2 away from the base region 17, i.e. in a region which is not deformed directly, and it projects into the base region 17 such that, in the event of inward deformation caused by impact, it is moved into the interior of the fuselage 2, rotating about the point of rotation in the process. The connecting element 18, e.g. a pull rod or a pull cable or the like, is coupled to the load-transmission element 19 in an offset manner in relation to the point of rotation 21, so that the connecting element 18 is drawn downwards in the direction of the base region 17 as a result of the load-transmission element 19 rotating. This movement can be utilized, in turn, to release a catch mechanism of the locking arrangement 4, as will be explained hereinbelow in conjunction with FIGS. 3a-3d.

FIGS. 3a-3d show schematic sectional views of an unlocking operation of the system 10 from FIGS. 1a and 1b. It is possible to see, by way of example, a locking point 8 of the door 1 articulated on the fuselage 2, wherein the outside of the aircraft 100 is indicated by the depicted aircraft skin 20, along which the main loading propagates during the flight. The locking arrangement 4 can be seen in detail in the sectional view taken along line A-A. In the first instance, the door 1 is locked firmly to the fuselage 2 via a catch bolt 9 mounted in a holder 22 (cf. FIG. 3a). The catch bolt 9 is connected to the connecting element 18 of the load-transmission device 5 from FIGS. 2a-2c such that the catch bolt 9 is drawn out of the locking arrangement 4 as soon as the load-transmission device 5 is actuated as a result of deformation of the fuselage 2 in the impact region 7 (cf. FIGS. 3b and 3c).

The door 1 is thus unlocked early on, in a first phase of impact, wherein the unlocking operation is driven directly by the kinetic impact energy. This means that the door can be designed or configured with considerably less reinforcement than is the case with conventional solutions, since, irrespective of any further deformation, the door is unlocked as early as the first phase of the impact. Furthermore, there is no need for any specific actuators, sensors and/or control devices. Rather, the solution illustrated provides a very straightforward and robust, purely mechanical solution for the automatic unlocking of the door in the event of impact.

Figure 3A:
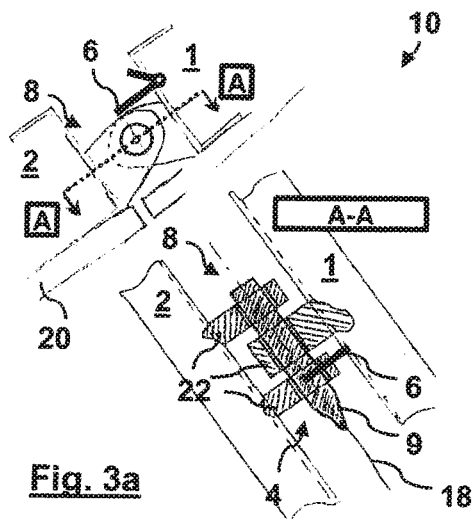
FIGS. 3a-3d are schematic sectional views of an unlocking operation of the system from FIGS. 1a and 1 b.
Figure 3B:
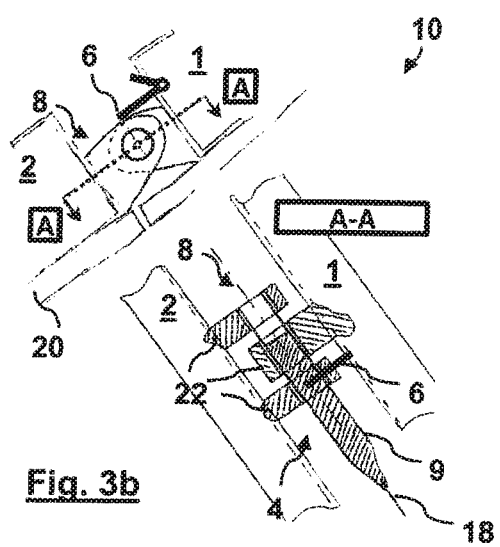
Figure 3C:
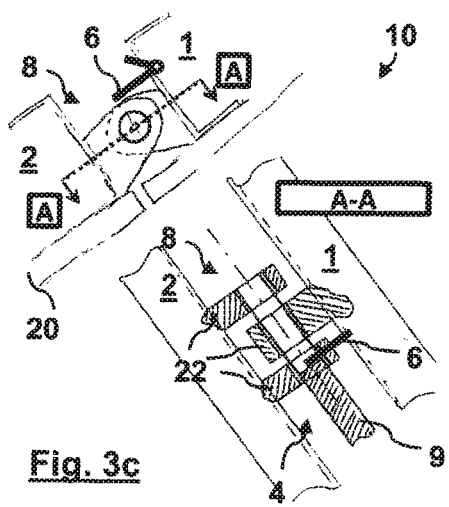
Figure 3D:
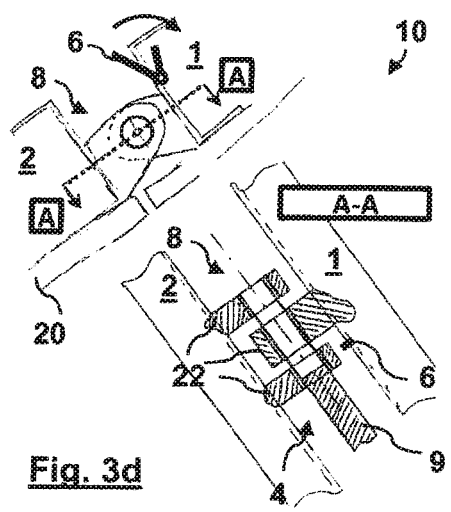

In this embodiment, the locking arrangement 4 also comprises an unlocking safeguard 6. The unlocking safeguard 6, in the form of a mechanical lever, is designed or configured to enable and/or to block unlocking of the door 1 by the load-transmission device 5. In FIGS. 3a-3c, the unlocking safeguard 6 blocks unlocking of the door 1. It is only in FIG. 3d that unlocking is enabled manually via actuation of the unlocking safeguard 6, e.g. by a flight attendant in the aircraft 100. This makes it possible to prevent undesired, early opening of the door 1.

In the preceding detailed description, various features have been combined in one or more examples in order to improve the cogency of presentation. However, it should be clear that the above description is merely illustrative, and in no way restrictive, in nature. It serves to cover all the alternatives, modifications and equivalents of the various features and exemplary embodiments. Many other examples will be immediately and directly clear to a person skilled in the art, based on his expert knowledge, in view of the above description.

In one example, it is possible for the load-transmission device to be designed or configured for example, rather than purely mechanically, as an alternative, or in addition, also electrically, hydraulically and/or pneumatically. For example, a hydraulic cylinder can be driven by inward deformation in order thus, in turn, to operate a catch mechanism of a locking arrangement.

The aircraft can be designed or configured, for example, in the form of a flying-wing aircraft, blended-wing-body aircraft or hybrid-wing-body aircraft or the like, it being possible for an impact region to be arranged in a fuselage region and/or a wing region. The door opening can be arranged, for example, likewise in a wing and/or wing region of the aircraft.

In that embodiment of the disclosure herein which is shown, inward deformation of the impact region is utilized in order to actuate a load-transmission device arranged within a fuselage. In principle, it is alternatively possible for the load-transmission device to be arranged at least to some extent outside the fuselage.

It is possible, for example, for the load-transmission device to have a lever which projects outwards from an impact region of the fuselage. The load-transmission device can be oriented, and designed or configured, such that, in the event of impact of the aircraft in the impact region, the lever is moved directly by the contact with an underlying surface or the like. It is possible for such a lever, or a corresponding device, to be moved upwards and unlock the door in this way.

The exemplary embodiments have been selected and described to enable the principles underlying the disclosure herein and their possible uses in practice to be presented as well as possible. This will enable those skilled in the art to modify and utilize the disclosure herein and its various exemplary embodiments optimally in respect of the intended purpose. The claims and the description use the terms "containing" and "having" as linguistically neutral concepts for the corresponding term "comprising". Furthermore, use of the terms "a" and "an" is not intended to exclude, in principle, a number, or plurality, of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Door
2 Fuselage
3 Door opening
4 Locking arrangement
5 Load-transmission device
6 Unlocking safeguard
7 Impact region
8 Locking point
9 Catch bolt
10 System
11 Upper passenger deck
12 Lower passenger deck
13 Seat
14a Upper-cabin floor
14b Lower-cabin floor
15a Upper supporting strut
15b Lower supporting strut
16a Upper crossbeam
16b Lower crossbeam
17 Base region
18 Connecting element
19 Load-transmission element
20 Aircraft skin
21 Point of rotation
22 Holder
100 Aircraft

The invention claimed is:

1. An aircraft comprising:
a fuselage;
a door opening of the fuselage;
a door configured to be articulated on the aircraft in the door opening;
a wing; and
a locking arrangement configured to lock the door to the fuselage when the door is in a closed, use state, wherein a first portion of the locking arrangement comprises a load-transmission element coupled to an impact region of the aircraft, which is a lower region of the fuselage of the aircraft and/or a lower region of the wing of the aircraft, wherein the load-transmission element is configured, in an event of an impact of the aircraft in the impact region, to transmit a deformation load, caused by inward deformation of the impact region, to a second portion of the locking arrangement to automatically unlock the door.

2. The aircraft according to claim 1, wherein the deformation load is transmitted at least one of: mechanically, hydraulically, and pneumatically.

3. The aircraft according to claim 1, wherein the load-transmission element is configured as at least as one of: a lever, a linkage, and a cylinder.

4. The aircraft according to claim 3, wherein the load-transmission element is configured to transmit the deformation load from the impact region of the aircraft to the second portion of the locking arrangement for automatically unlocking the door upon occurrence of the inward deformation of the impact region of the aircraft.

5. The aircraft according to claim 1, wherein, in order to transmit the deformation load, the first portion of the locking arrangement is configured to perform at least one of: a translatory movement and a rotary movement.

6. The aircraft according to claim 1, wherein the impact region is adjacent to the door opening.

7. The aircraft according to claim 1, wherein the door opening is in a region of the aircraft that is not deformed directly by the inward deformation of the impact region caused by the impact of the aircraft in the impact region.

8. The aircraft according to claim 1, wherein the impact region is spaced apart from the door opening.

9. The aircraft according to claim 1, wherein the locking arrangement comprises an unlocking safeguard configured to perform at least one of: blocking and enabling unlocking of the door by the portion of the locking arrangement.

10. The aircraft according to claim 9, wherein the unlocking safeguard is configured for manual actuation.

11. The aircraft according to claim 1, wherein the aircraft comprises at least one upper passenger deck and a lower passenger deck beneath the at least one upper passenger deck, wherein the door opening is formed in the aircraft to provide access to the lower passenger deck.

* * * * *